Figure 3:
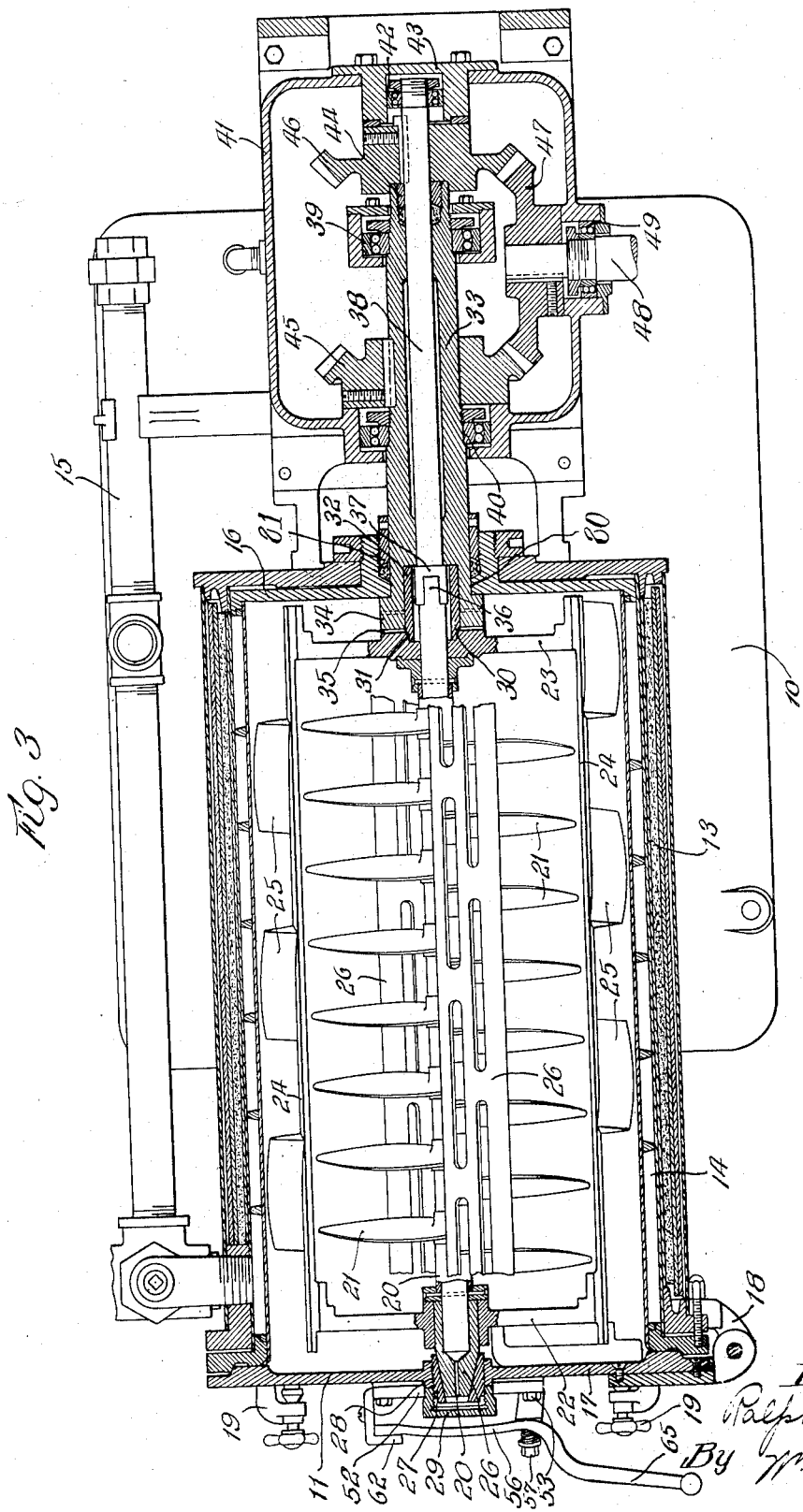

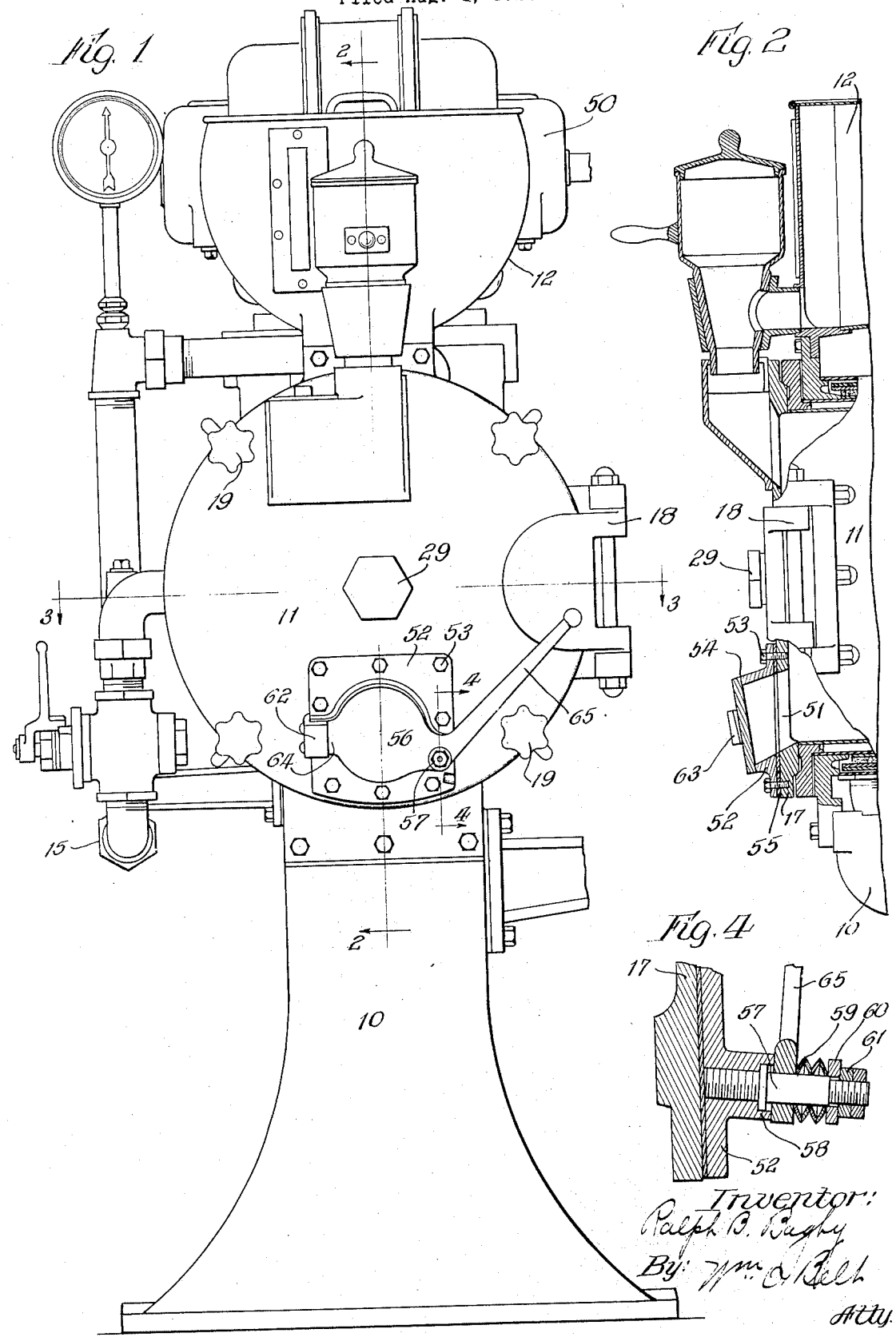

Oct. 21, 1924.

R. B. BAGBY 1,512,665

ICE CREAM FREEZER

Filed Aug. 4, 1922

2 Sheets-Sheet 2

Inventor:
Ralph B Bagby
By Wm. O. Belt
Atty.

Patented Oct. 21, 1924.

1,512,665

UNITED STATES PATENT OFFICE.

RALPH B. BAGBY, OF CEDAR RAPIDS, IOWA, ASSIGNOR TO J. G. CHERRY COMPANY, OF CEDAR RAPIDS, IOWA, A CORPORATION OF IOWA.

ICE-CREAM FREEZER.

Application filed August 4, 1922. Serial No. 579,668.

*To all whom it may concern:*

Be it known that I, RALPH B. BAGBY, a citizen of the United States, residing at Cedar Rapids, in the county of Linn and State of Iowa, have invented certain new and useful Improvements in Ice-Cream Freezers, of which the following is a specification.

This invention relates to ice cream freezers and has for its principal objects to permit the dasher to be readily removed from the freezing cylinder and as readily replaced in operative connection with the driving mechanism therefor; to improve the outlet and the gate mechanism; to eliminate condensation and the consequent staining of the ice cream; and to generally improve the construction and operation of these machines.

Further objects of the invention will become apparent as the description is read in connection with the accompanying drawings and in which—

Fig. 1 is a front elevation of a freezer made according to my invention; and

Figs. 2, 3 and 4 are sectional views taken on the lines 2—2, 3—3 and 4—4 of Fig. 1.

Referring to the reference numerals on the drawing, 10 indicates a base upon which is suitably supported a freezing cylinder 11 and a tank 12 for the liquid to be frozen. The cylinder is preferably provided with a suitable insulating jacket 13 and passages 14 for brine which is supplied through the usual or any desired piping 15. The rear head 16 is preferably fixed while the front head 17 is mounted on hinges 18 and secured in closed position by clamps 19. Within the cylinder is a dasher composed of an inner stirring element including a shaft 20 and paddles 21 and an outside stirring and scraping element including spiders 22 and 23 connected by webs 24 equipped with spiral elements 25 and any suitable scraper elements 26. The particular details of the elements for beating, stirring, propelling and scraping are of no particular interest in the present case and will not be described in detail. The shaft 20 is fitted at the front end with the stud 26' of Delhi stainless steel which is tapered as indicated at 27 to fit within a phosphor bronze bushing 28 threaded into a suitable boss in the hinged front head 17. The bushing is preferably longer than the boss and receives a cap 29 which acts as a lock nut to retain the bushing in an adjusted position.

The spiders 22 and 23 are rotatably mounted on the shaft 20 and are driven in the opposite direction thereto. The spider 23 is provided with a conical seat 30 which receives a correspondingly shaped extension 31 on the end of a centering bushing 32 which is fixed within a tubular shaft 33. The enlarged front end of this shaft adjacent to the tapered portion 31 of the bushing is provided with preferably square teeth 34 for cooperation with similar teeth 35 on the spider 23 to effect a driving engagement between the shaft and the spider. These teeth in connection with the center bushing form a sort of self-aligning or centering chuck that permits the outer element of the dasher to be readily disengaged from the driving shaft 33 and as readily engaged therewith when it is desired to replace the dasher. The shaft 20 floats in the hub of the spider 23 and has a flattened end 36 which is received in the forked end 37 of a shaft 38 rotatably mounted within the shaft 33.

The shaft 33 is shouldered adjacent to the teeth 34 and passes through the rear head 16 into a suitable housing or gear case 41 where it is journaled on ball bearings 39 and 40. The opening 80 in the rear head is large enough to admit the shaft with clearance and a stuffing box 81 is provided to prevent leakage of cream in to the housing 41. The rear end of the shaft 38 extends through the stuffing box 44 in the end of the shaft 33 and is journaled on ball bearing 42 carried by a plug 43 fitted to the end of the housing 41. The shafts 33 and 38 are equipped with bevel gears 45 and 46 which mesh with a bevel gear 47 carried by a shaft 48 journaled in ball bearings 49 in the side of the housing 41 and receiving power in any suitable manner from a prime mover such as a motor 50.

With this construction it will be clear that by releasing the clamps 19 and swinging the front head 17 to one side the dasher can be readily removed from the cylinder by simply pulling it forward and as readily replaced by merely pushing it rearward and giving each of the elements slight rotation to align the clutch elements forming the driving engagement. No manual lifting of the dasher is necessary; it rests with the elements 25 on the bottom wall of the cylinder, and, when pushed rearward, the tapered wall of the seat 30 rides on similar surface of the centering bushing and brings the parts into accurate alignment. This is a very important feature of the invention and one which results in a great saving of time and energy in practical use. It will be noted in this connection that no part of the dasher extends through the rear head of the freezer, and that the centering bushing and the driving teeth are so located as to facilitate engagement with the complemental parts of the dasher.

The use of ball bearings in mounting the several shafts within the casing reduces the friction, keeps the parts aligned, and results in an extremely easy and silent running machine.

The taper of the stud 26 is approximately on the arc of a circle whose center lies in the axis of the hinge 18. Consequently the front head can easily swing to and from closed position. The use of stainless steel and phosphor bronze in this front bearing prevents discoloration of the ice cream and at the same time reduces friction in wear to a very small minimum. The adjustable mounting of the bushing 27 permits the dasher to be quickly aligned and tightened and the locking cap 29 retains the bearing in proper adjustment.

The outlet 51 is preferably at the bottom of the front head 17 and inclines downwardly as particularly illustrated in Fig. 2. The outlet flange 52 is secured to the outer face of the front head by cap screws 53 and its front edge is cut on an incline as indicated at 54. Between the flange 52 and the outer face of the front head is interposed an insulating sheet of fiber 55.

The brine used in these machines is usually at a temperature of about 0° F. The front brine jacket ring, the freezing tube ring and the front head being made of good conducting material, the latter is quickly brought to and maintained at a very low temperature, which causes frost to form over the outer surface in considerable quantity. The mixture to be frozen is ordinarily at about 40° F., or upwards; and, when an incoming batch passes from the tank 12 through the inlet flange, it warms the head, melting the frost which runs down and drips off the bottom back of the ice-cream can that receives the last of the frozen batch from the outlet flange. The insulation 55 prevents the outlet flange from being affected by the change in temperature of the front head and thereby eliminates the condensation that would be in position to drip into the ice-cream cans seated below the outlet.

The gate 56 is pivoted on a stud 57 projecting outwardly from the outlet flange 52 as indicated particularly in Fig. 4. The inside of the gate at the pivot rests against a boss 58 surrounding the stud and the outside bears against one of a series of Belleville springs 59 which are compressed by a washer 60 and nuts 61. From Fig. 1 it will be seen that the stud 57 is at one side near the bottom of the outlet, and at the opposite side of the outlet the flange 52 is equipped with a bracket 62 having an inclined flange 63 which cooperates with the arm 64 on the gate to press the gate tightly in contact with the face 54 of the outlet flange.

The Belleville springs 59 support the gate very firmly and evenly but permit a slight yielding necessary to proper operation and the wedge-shaped flange 63 together with these springs retain the gate tightly in closed position. For convenience in operation the gate is equipped with a handle or lever arm 65 which gives sufficient mechanical advantage to permit the gate to be easily operated.

More or less trouble has been experienced in the past with condensation which would drop from time to time into the finished ice cream, and being of the blackish color, spoil the appearance of the product. By the use of the insulation 55 this condensation is entirely eliminated.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In an ice cream freezer, the combination of a cylinder, an axial rotary dasher therein including a dasher shaft and a spider rotatable upon the shaft, dasher driving means including an outer hollow drive shaft and an inner drive shaft within the hollow drive shaft, said hollow drive shaft extending inwardly through one of the cylinder heads, the other cylinder head being removable, the dasher being insertable and removable through the end of the cylinder having the removable head, there being a slip joint drive connection between the inner end of the hollow shaft and the spider and also between the dasher shaft and the inner drive shaft, the hollow drive shaft and the spider being provided with self centering means including a tapered concentric recess in the spider and a complementary tapering concentric projection on the hollow drive shaft.

2. In an ice cream freezer, the combination of a cylinder, a rotary dasher therein including a dasher shaft and a spider rotatable upon the shaft, dasher driving means including an outer hollow drive shaft and an inner drive shaft within the hollow drive shaft and means for actuating the drive shafts in opposite directions, complementary interfitting teeth on the spider and the outer drive shaft, a socket and projection driving connection between the inner drive shaft and the dasher shaft, the outer drive shaft being provided with an externally tapered concentric projection at its inner end, and the spider being provided with a complementary tapered recess receiving the tapered projection for centering the dasher with respect to the drive shafts.

3. In an ice cream freezer, the combination of a cylinder, an axial rotary dasher therein, dasher driving means having a rotary part extending inwardly through one of the cylinder heads, the other cylinder head being removable, the dasher being insertable and removable through the end of the cylinder having the removable head, there being a self centering slip joint detachable driving connection between the dasher and the said rotary part, and there also being a self centering bearing connection between the front end of the dasher and the removable front cylinder head.

4. In an ice cream freezer, the combination of a cylinder, an axial rotary dasher therein, dasher driving means having a rotary part extending inwardly through one of the cylinder heads, the other cylinder head being removable, the dasher being insertable through the end of the cylinder having the removable head, there being a self centering slip joint detachable driving connection between the dasher and the said rotary part, the front end of the dasher having a tapered bearing stud, and the removable front cylinder head having a tapered bearing recess complementary to and receiving the bearing stud and constituting therewith a self centering means for the dasher.

5. In an ice cream freezer, the combination of a freezing cylinder having a removable front head, a dasher including a shaft equipped with a tapered bearing stud, an endwise adjustable bearing bushing within said head for receiving said stud, and means for locking said bushing.

6. In an ice cream freezer, the combination of a freezing cylinder having an outlet in its front head, a tubular outlet flange secured to said front head adjacent to said outlet, and a sheet of insulating material between said flange and said head.

7. In an ice cream freezer, the combination of a freezing cylinder having a discharge opening in its front head in one wall thereof, an outlet flange secured to said wall and having an opening aligned with the opening therein, and a sheet of fiber interposed between said cylinder and said flange.

RALPH B. BAGBY.